United States Patent [19]
Kashima

[11] Patent Number: 4,768,826
[45] Date of Patent: Sep. 6, 1988

[54] SADDLE FOR BICYCLE
[75] Inventor: Tetsuo Kashima, Osaka, Japan
[73] Assignee: Kashima Saddle Manufacturing Co., Ltd., Osaka, Japan
[21] Appl. No.: 32,347
[22] Filed: Mar. 31, 1987
[30] Foreign Application Priority Data
Nov. 29, 1986 [JP] Japan .............................. 61-184355[U]
[51] Int. Cl.[4] ................................................. A62J 1/00
[52] U.S. Cl. ..................................... 297/195; 297/183
[58] Field of Search ................................. 297/195, 183
[56] References Cited
U.S. PATENT DOCUMENTS

| | | | |
|---|---|---|---|
| 1,224,861 | 5/1917 | Walker | 297/183 |
| 1,961,145 | 6/1934 | Harley et al. | 297/195 |
| 2,519,027 | 8/1950 | Disney et al. | 297/195 X |
| 2,564,924 | 8/1951 | Patton | 297/183 |
| 2,747,654 | 5/1956 | Chapman et al. | 297/183 |
| 3,408,090 | 10/1968 | Fritz et al. | 297/195 X |
| 4,662,677 | 5/1987 | Hughes | 297/195 |
| 4,664,441 | 5/1987 | Collins | 297/183 |

FOREIGN PATENT DOCUMENTS

| | | | |
|---|---|---|---|
| 7730 | 1/1951 | Fed. Rep. of Germany | 297/183 |
| 1163550 | 9/1969 | United Kingdom | 297/195 |

Primary Examiner—Peter A. Aschenbrenner
Attorney, Agent, or Firm—Fred Flam

[57] ABSTRACT

A saddle for a bicycle comprises a nose-like front part, a rear part having a larger width portion, and an edge part formed with walls extending downward wherein the rear part has an elongated opening to allow insertion of fingers, the opening extending along the rear edge part in order to provide a grip or handle formed by means of the wall extending between the opening and the rear edge part. The grip or handle at the rear if this saddle is formed so that a freestyle rider may hold this grip with his thumb and four fingers.

2 Claims, 2 Drawing Sheets

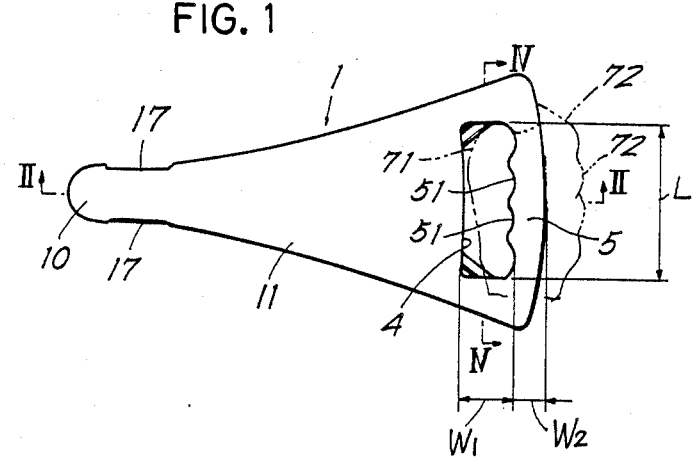
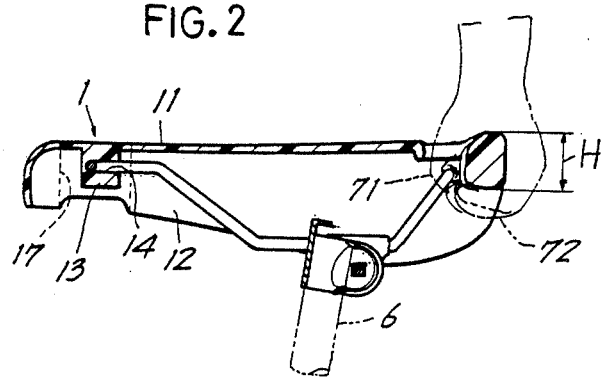
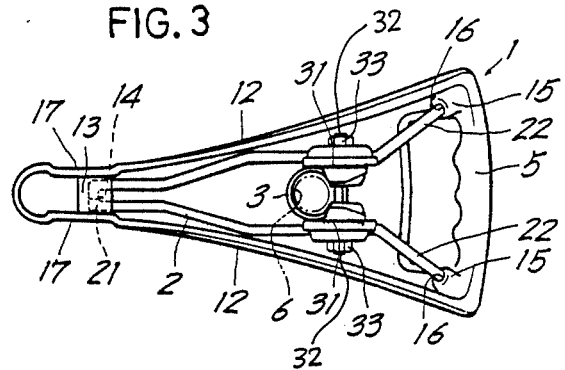

SADDLE FOR BICYCLE

INDUSTRIAL FIELD OF THE INVENTION

The present invention relates to a saddle for bicycles.

PRIOR ART

The sport of freestyle bicycle riding has recently become popular. It is a sport in which riders demonstrate their skills in keeping their balance while performing various tricks and maneuvers with the body on the bicycle. For example, in such a performance a rider may want to do a hand stand on the bicycle by gripping the saddle 1 and the handlebar 8 as shown in FIG. 5. Or he may stand on the bicycle with his feet positioned on the saddle and the handlebar. Other freestyle tricks involve riding the bicycle up a curved wooden ramp, jumping the bike into the air, turning, then landing the bike again on the lower part of the ramp.

In a freestyle bicycle contest the bicycle saddle can therefore play an important role as a means by which a rider maintains good balance and control over both himself and his bicycle. Until now, conventional saddles are used in freestyle contests. Though they are slimmer than ordinary bicycle saddles, they are not structurally different. When a rider takes a hand-stand position on the bicycle, he places the palm of his hand 7 on the saddle 1 at the rear of the seat. He then grasps the saddle with four fingers 72 which extend to the bottom surface of the saddle along its rear edge, as shown in FIG. 6. However, on a conventional saddle, the rider's thumb simply rests of the saddle and has no role in gripping the seat. This poor grip can result in a rider losing his grip and falling from the bicycle.

In order to maintain balance and control, a freestyle rider's grip must be firm and secure. On ordinary saddles, a rider's hand can easily slip, causing loss of balance.

SUMMARY OF THE INVENTION

The present saddle invention provides a bicycle saddle incorporating an opening along the rear edge of the saddle which allows for the insertion of a rider's fingers and hand. It thus provides a grip or handle as a means for the rider to hold the saddle firmly and securely.

The present saddle invention further provides an improved gripping area at the nose of the saddle. This area consists of shallow grooves located on opposed sides of the front nose part of the seat. These grooves have enough width to allow a grip with two fingers. Such a grip is necessary in freestyle riding when the maneuver calls for the rider to simultaneously grasp the nose of the saddle and the very end of the handle bar (front wheel turned sideways).

BRIEF EXPLANATION OF DRAWINGS

FIG. 1 is a plan view of a saddle for bicycles according to the present invention.

FIG. 2 is a sectional view taken along the line II—II of FIG. 1.

FIG. 3 shows a bottom view of the saddle.

DETAILED EXPLANATION OF EMBODIMENTS

Figure 5:
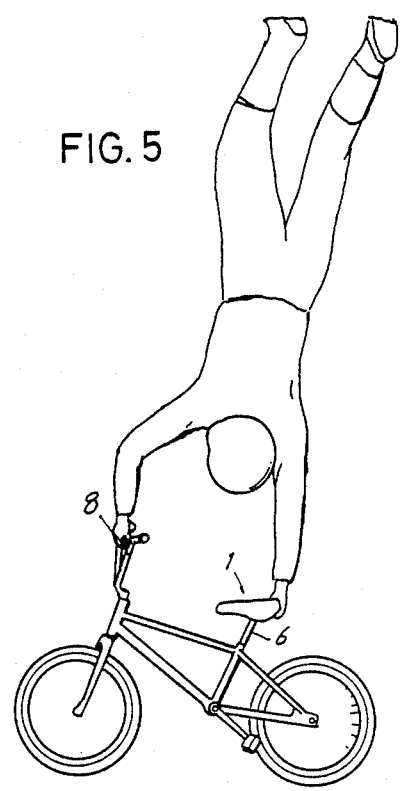
FIG. 5 is an illustration which shows a freestyle rider performing a hand stand maneuver, a stunt which would occur in a freestyle contest or exhibition.
Figure 4:
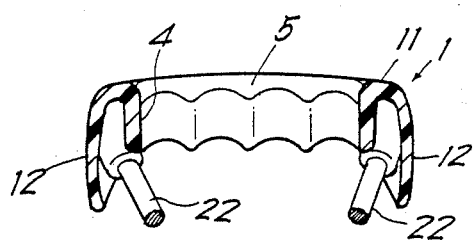
FIG. 4 is a sectional view taken along the line IV—IV of FIG. 1.
Figure 6:
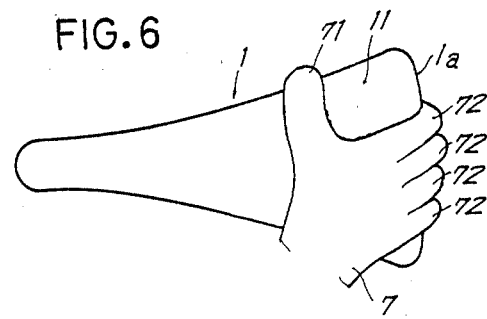
FIG. 6 is an illustration which shows how a conventional bicycle saddle would be gripped.

The preferred embodiment of the present invention will be described below in detail.

Saddle 1 is formed by injection molding of plastic. It has a total length of approximately 270 mm from the front end of nose 12 to the wider rear end, and it has a maximum width of approximately 140 mm at the rear end. The seat 11 has a shape like an isosceles triangle.

The seat 11 is formed at its edge part with its wall 12 extending downward and substantially perpendicular thereto. At the rear end the wall is formed over the entire width (portion W2) in order to shape the grip 5, which will be described later in detail.

The saddle 1 is formed at its nose part with a rib 13 extending along the lower surface of the saddle and connecting with opposed walls 12, 12. It is further formed at both ends of the rear section with bosses 15, 15 having insertion holes 16, 16.

The rib 13 is formed with a fitting hole 14 that extends from the rear toward the front portion. Base wire 2 has a front end 21 which is fitted into the hole 14, and base portion 22 is fitted into the insertion hole 16 of the boss 15.

The base wires 2 are equipped with a seat post mounting device or clamp, which is comprised of a loop clip 3, clip washers 31, clip bolts 32 and clip nuts 33 as shown in FIG. 3. The loop clip 3 is fitted into the seat post 6 of the bicycle used for freestyle maneuvers so that it is clamped to hold the saddle 1 to the seat post 6.

The present invention is characterized by the fact that it provides an elongated opening 4 at its rear portion 11 extending along the rear edge of the saddle. It thus forms a grip section 5 between the elongated opening 4 and the rear edge of the saddle 1. The opening 4 is approximately 90 mm in length (L) and approximately 35 mm in width (W1). These dimensions are considered adequate in size to allow the insertion of a rider's fingers and hand when the grip portion 5 is used in the course of a freestyle maneuver.

The width (W2) of the grip portion 5 varies between 15 and 20 mm, and the height (H) is approximately 25 mm. The grip portion 5 is further formed at the front and lower surfaces thereof with arc shaped, shallow grooves 51 which fit each of the fingers therein. These finger grooves make it easier for the rider to hold the grip portion and effectively prevent his fingers from slipping in the grip portion 5.

The saddle 1 is formed at opposed walls 12, 12 of the nose portion 10 with shallow grooves 17, 17. These grooves roughly fit the width of two fingers.

When a rider performs a stunt on a freestyle bicycle by holding the saddle 1, the fingers 72 may be inserted into the elongated opening 4 of the saddle, and the thumb can grip the handle from the rear edge to the lower surface and, further, to the inner surface of the handle, thus permitting a firm grasp of the saddle. Because the thumb 71 holds the grip portion 5 from a direction opposed to that of the remaining four fingers 72, the rider can hold the present saddle much more firmly than a conventional saddle. As previously mentioned, a conventional saddle may be grasped by four fingers at its rear edge only—the thumb having no place to achieve a grip. The likely result of gripping a conventional saddle in a freestyle stunt situation is an insecure hand-hold and possible slipping of the hand.

With the present saddle it is also possible for the rider to grip the saddle by fitting the thumb into the elongated opening 4 and placing the remaining four fingers 72 over the rear edge of the saddle to achieve a grip.

In a freestyle bicycle contest, stunts are sometimes performed by placing the hand at the nose 10 of the saddle. In order to prevent a rider's fingers from losing their grip during such stunts, the saddle 1 has shallow grooves 17 formed at opposed sides 12, 12 of the nost portion 10. When a rider must lift the bicycle, or pull it upright from a side-rest position, it is possible for him grab the handle portion and gain good control of the maneuver. This grip or handle can be used by freestyle riders in a variety of stunts and maneuvers too numerous to list here.

In addition to the above, because the elongated opening 4 is formed at the rear portion of the seat 11, the area in the vicinity of the opening is deformable, which increases the cushion effect of the seat itself 11.

The present invention is not limited to the foregoing embodiments, but it can, of course, be modified in various ways within the technical scope set forth in the appened claims.

What is claimed is:

1. In a saddle for a bicycle:
said saddle having a front part and a rear part;
said front part having a nose portion which becomes narrow towards its front end;
said rear part having a larger width portion to form a seat;
said saddle having a peripheral edge part which is formed with wall portions extending downwardly;
said saddle having an elongated opening formed in the rear part and sized to permit insertion of at least the finger portions of the hand of a rider, said opening extending transverse to the length of the saddle within the peripheral boundaries of said seat to provide a cushion effect therefor; and
a grip means formed by said wall portion between said opening and the rear edge part that may be grasped by four fingers and thumb of the rider.

2. A saddle for a bicycle comprising;
a front part of the saddle having a nose portion which becomes narrow towards its front end,
a rear part of the saddle having a larger width portion,
an edge part along a periphery of the saddle which is formed with wall portion extending downward,
the rear part having an elongated opening which allows insertion of at least the finger portions of a hand of a rider, the opening extending substantially along the rear edge part, and
a grip part formed by the wall between the opening and the rear edge part that may be grasped by four fingers and a thumb of the rider,
said nose portion being formed at its opposed walls with shallow grooves having enough width to allow a contact grip by two fingers.

* * * * *